OR 4,027,938

United States Patent
Lewis

[11] 4,027,938
[45] June 7, 1977

[54] FIBER OPTIC CABLE CONNECTOR

[75] Inventor: Adolph L. Lewis, La Mesa, Calif.

[73] Assignee: The United States of America as represented by the Secretary of the Navy, Washington, D.C.

[22] Filed: July 1, 1976

[21] Appl. No.: 701,467

[52] U.S. Cl. .......................... 350/96 C; 350/96 B
[51] Int. Cl.² .......................................... G02B 5/16
[58] Field of Search ......... 350/96 C, 96 R, 96 WG, 350/96 B

[56] References Cited

UNITED STATES PATENTS

| 3,455,625 | 7/1969 | Brumley et al. | 350/96 C |
| 3,922,064 | 11/1975 | Clark et al. | 350/96 C |

OTHER PUBLICATIONS

Parfitt et al. "Interconnections and Switches for Glass Fibre Optical Links" Electronic Components, Jan. 72.
Thiel et al., "In-Line Connectors for Multimode Optical Waveguide Bundles" App. Optics vol. 13, No. 2. Feb. 74.

Primary Examiner—John K. Corbin
Assistant Examiner—Stewart Levy
Attorney, Agent, or Firm—R. S. Sciascia; G. J. Rubens; J. W. McLaren

[57] ABSTRACT

A fiber optic cable connector is comprised of two ferrules, a collar member, and a connection sleeve. First and second ferrules each have an internal bore to receive the end of fiber optic cable bundles together with a suitable bonding material for securing the fiber optic cable bundles. The terminal ends of the fiber optic cable bundles are ground and polished substantially optically flat. A first ferrule has external threads on a portion at its terminal end. The collar member is internally threaded and dimensioned to engage over the external threads of the first ferrule, and has a cylindrical portion coaxially extending beyond the terminal end of the first ferrule effectively forming a cylindrical recess. A second ferrule has a cylindrical embossment dimensioned to be received within the coaxially extending portion of the collar member for aligning the two fiber optic cable bundles. External threads on the outermost portion of the second ferrule at its terminal end are engaged by the internal threads of a connection sleeve which has an inwardly disposed flange at its other end dimensioned to bear upon an end of the collar member for drawing the two terminal ends of the fiber optic cable bundles together in an aligned assembly.

5 Claims, 2 Drawing Figures

FIBER OPTIC CABLE CONNECTOR

BACKGROUND OF THE INVENTION

Before the advent of modern optical technologies, most data transmission and communication systems employed electronic techniques almost exclusively. However, optical techniques are now finding increasing usage in such data transmission and communications systems, many of which employ fiber optic cables for the propagation and transmission of optical energy signals representative of data and communications information. Such fiber optic cables may be of the single filament or the multi-filament or bundle type, but in any event it is necessary to employ specially designed connectors at each terminal or interconnection between such fiber optic cables.

Connectors which efficiently perform the function of transmitting light energy at terminal ends of fiber optic cables (whether it be relative to another fiber optic cable, a photo-responsive device, or a source of optical signal energy) must possess the capability of minimizing light losses, facilitate the ready connection and disconnection of the terminal ends of such fiber optic cables, and, additionally, impose a minimum mechanical strain, particularly of a twisting or rotary nature, on the fiber optic cables since they are in fact composed of glass which will not withstand an undue amount of twisting or bending without undesirable resultant damage.

Accordingly, there is a need for a simple, inexpensively fabricated connector, which is adaptable for coupling multi-filament fiber optic cables of the bundle type to facilitate the efficient transmission of optical energy therethrough.

Additionally, such an optical connector must desirably have the attributes of requiring very little or no twisting during the course of its use to connect and disconnect two fiber optic cable bundle ends.

Moreover, it is highly desirable that such a simple, inexpensively fabricated connector for coupling multi-filament fiber optic cable bundles provide a means for assuring efficient optical alignment of the terminal ends of the bundles when the connector is in its assembled form and transmitting light energy signals therethrough.

SUMMARY OF THE INVENTION

The fiber optic cable connector contemplated by the present invention comprises four principal elements including first and second ferrules, a collar member, and a connection sleeve. The first ferrule has an internal bore therethrough to receive the end of a first fiber optic cable bundle. A suitable bonding material secures the first fiber optic cable bundle within the internal bore and the terminal end of the first ferrule including the first fiber optic cable bundle and the bonding which secures it therein is ground and polished to a substantially optically flat surface at the terminal end. The first ferrule also includes external threads at its terminal end.

A collar member is internally threaded and dimensioned to engage over the external threads of the first ferrule terminal end and has a cylindrical portion which coaxially extends beyond the terminal end of the first ferrule. Accordingly, when a collar member is positioned with its threads engaged with those of the first ferrule, a cylindrical recess is formed by the extension of the collar member beyond the terminal end of the first ferrule.

A second ferrule has an internal bore therethrough essentially the same as that of the first ferrule and in a similar manner also receives the end of a second fiber optic cable bundle. Suitable bonding material secures the second fiber optic cable bundle within the internal bore of the second ferrule much in the same manner as the secured assembly of the first ferrule. The terminal end of the second ferrule is ground and polished substantially optically flat in the manner previously described.

The second ferrule differs in configuration from the first ferrule, however, in that it has a terminal end which includes a cylindrical embossment dimensioned to be received within the coaxially extending portion of the collar member. When the cylindrical embossment of the terminal end of the second ferrule is received and positioned within the portion of the collar member coaxially extending beyond the terminal end of the first ferrule, the two terminal ends are coaxially and opticlly aligned to facilitate the most efficient transmission of optical energy therethrough.

a connection sleeve has internal threads at one end dimensioned to engage the external threads of the second ferrule and an inwardly disposed flange at its other end dimensioned and configured to bear upon an end of the collar member, thus drawing the two terminal ends together in aligned assembly and securing the elements of the combination in firm assembly.

In a preferred embodiment of the present invention, the first and second ferrules may have partially concially tapered internal bores to facilitate the reception and positioning of the fiber optic cable bundles for bonding and securing the fiber optic cable bundles with a suitable material such as epoxy, for example.

Additionally, in a preferred embodiment of the present invention the two fiber optic cable terminal ends are drawn into a final assembled position with a small space between their optically ground and polished ends to avoid damage to the optically polished terminal ends. That small space may be occupied by an optically transmissive fluid of substantially the same index of refraction as the two connected fiber optic cable bundles for more efficiently transmitting optical energy in the optical path therebetween.

Further, it is been found that assembly of the fiber optic cable connector of the present invention is facilitated by providing the collar member with slots disposed transversely relative to its internal threads. Such slots in the collar member provide convenient assembly of the connector of the present invention and, in particular facilitates that step of the procedure which involves threading the collar member onto the external threads of one of the first ferrule member.

Accordingly, it is a primary object of the present invention to provide an improved connector for coupling fiber optic cable bundles in a light transmitting connection which minimizes light losses therethrough.

An equally important object of the present invention is to provide such a connector for coupling fiber optic cable bundles in axial alignment which minimizes twisting stress and strain of the fiber optic cables being joined in the course of connection and disconnection procedures.

Another object of the present invention is to provide an improved fiber optic bundle connector which facilitates the grinding and polishing of fiber optic cable bundles to substantially optically flat surfaces before assembly in the connector to transmit light energy signals therethrough.

Yet another object of the present invention is to provide a connector for coupling fiber optic bundles which is effectively self-aligning along a single coaxail optical path for improving light transmission therethrough.

A concomitant object of the present invention is to provide an improved connector for coupling fiber optic cable bundles which is simple in design, comprises a minimum number of elements, and is readily adaptable to inexpensive manufacture by conventional machinery and techniques.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENT

The present invention contemplates a connector for joining two fiber optic cable bundles in coaxial alignment for efficient transmission of light signal information.

Figure 1:
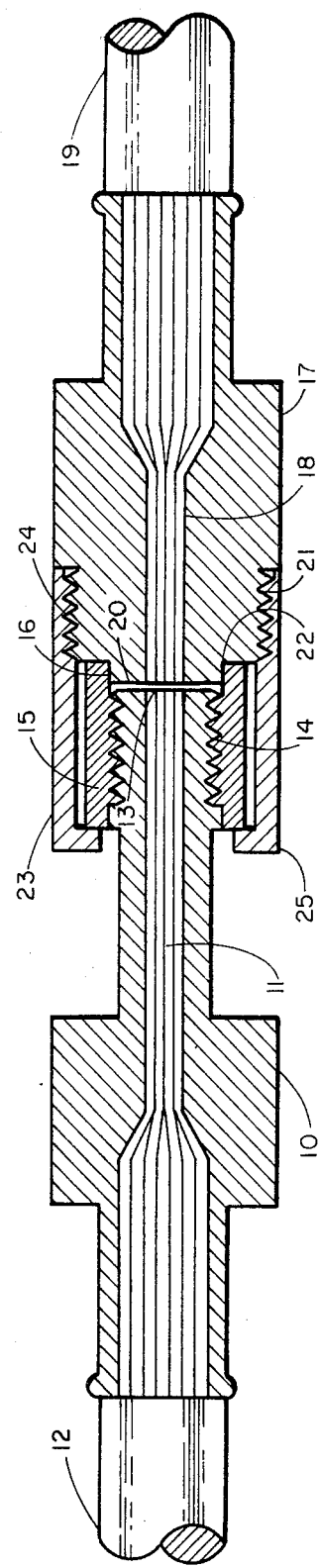
FIG. 1 is a greatly enlarged cross-sectional view of the connector of the present invention; and, FIG. 2 is a perspective view of the collar member employed in a preferred embodiment of the present invention.

As illustrated in FIG. 1, a first ferrule 10 has an internal bore therethrough to receive the end of a first fiber optic cable bundle 12. A suitable bonding material, such as epoxy, is employed in the internal bore 11 to secure the first fiber optic cable bundle therewithin. When the epoxy material has set properly, the terminal end 13 of the first ferrule 10 is ground and polished to a substantially optically flat surface to enhance the efficient transmission of light energy signals.

External threads 14 extend along the terminal end of the first ferrule 10. A collar member 15 is internally threaded and dimensioned to engage over the external threads 14 of the first ferrule 10. It should be noted that in its fully engaged position as shown in FIG. 1, the collar member 15 has a cylindrical portion 16 which extends beyond the terminal end of the first ferrule 10. Thus, a cylindrical cavity is formed which is coaxial aligned with the first fiber optic cable bundle 12 secured in the first ferrule 10.

A second ferrule 17 includes an internal bore substantially identical to that of the first ferrule 10. In a manner similar to that previously described, a second fiber optic cable bundle 19 is secured within the internal bore 18 by a suitable bonding material such as epoxy, for example, and the terminal end of the bonded fiber optic cable bundle is ground and polished to a substantially optically flat surface 20.

The second ferrule 17 has external threads 21 extending along its terminal end, additionally, a cylindrical embossment 22 extends beyond the threaded portion 21 and is dimensioned to be received within the coaxially extending portion 16 of the collar 15, thus aligning the two fiber optic cable bundles for the most efficient transfer of light energy signals from one to the other.

A connection sleeve 23 has internal threads 24 at one end which are dimensioned to engage the external threads 21 of the second ferrule. At its other end the connection sleeve has an inwardly disposed flange 25 which is dimensioned to bear upon the end of the collar member 15.

The four principal component elements of the connector of the present invention are, of course, fabricated separately and in practice the two fiber optic cable bundles 12 and 19 are initially secured within respective first and second ferrules 10 and 17 with a suitable bonding material such as epoxy, for instance.

The ferrule terminal ends may be ground and polished by a suitable means such as the use of a Fiber Optic Grinding and Polishing Tool of the type disclosed in U.S. Patent application SER. No. 580,856, filed May 27, 1975, in the name of the inventor herein. The connector is then assembled by joining two ferrules, the collar member, and the connection sleeve.

In the procedure of assembly, the connection sleeve 23 is slipped over the terminal end of the first ferrule 10. The collar member 15 is then inserted through the open end of the connection sleeve 23 and screwed down tightly on the external threads 14 of the first ferrule 10.

Figure 2:
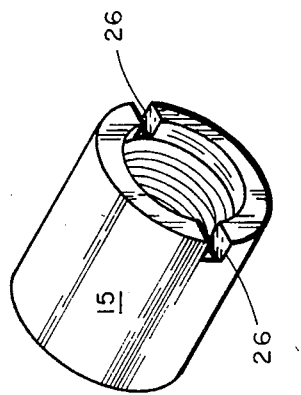

This step may best be accomplished by the improvement included in the preferred embodiment of the present invention which comprises slots transversely positioned relative to the internal threads of the collar member 15. Such slots are shown at 26 in FIG. 2 and in this step of the assembly procedure, a small screw driver or similar tool may be employed to firmly screw down the collar member 15 on the external threads 14 of the first ferrule 10 by inserting the screw driver through the open end of the connection sleeve 23.

The final step in the assembly procedure is to engage the internal threads of the connection sleeve 23 with the external threads of the second ferrule 17 to draw the two fiber optic cable bundles together in optical alignment as shown by the assembled cross-sectional view of FIG. 1.

Those skilled and knowledgeable in the pertinent arts will appreciate that the fiber optic cable bundle connector of the present invention employs a minimum of parts and elements, but nonetheless facilitates the optical alignmment of two abutting connected fiber optic cable bundles to permit the realization of best efficiency in the transmission of light energy signals from one fiber optic cable to another.

Moreover, because of the concept of the present invention, two fiber optic cables may be joined in an efficient optical connection without undergoing any undue mechanical stress particularly of a twisting nature, since the two ferrules need not be twisted during the final steps of assembly which comprises threading the connection sleeve to the second ferrule.

Additionally, because of the configuration of the matching parts employed in accordance with the concept of the present invention, the two ferrules which secure the fiber optic cable bundles therein are aligned automatically in completing the simple steps of the procedure of assembling the connector.

Obviously disconnection as well as connection and assembly of the connector of the present invention is afforded without placing any undue stress or strain of a mechanical nature on either of the fiber optic cables.

Obviously many modifications and variations of the present invention are possible in the light of the above teachings. It is therefore to be understood that within the scope of the appended claims the invention may be practiced otherwise than as specifically described.

What is claimed is:

1. A fiber optic cable connector comprising:
   a first ferrule having an internal bore therethrough to receive the end of a first fiber optic cable bundle and bonding material for securing said first fiber optic cable bundle within said internal bore,
   said first ferrule, first fiber optic cable bundle, and bonding material being ground and polished substantially optically flat at a terminal end;
   external threads on a portion of said first ferrule at its terminal end;
   a collar member internally threaded and dimensioned to engage over said external threads and having a cylindrical portion coaxially extending beyond the terminal end of said first ferrule;
   a second ferrule having an internal bore therethrough to receive the end of a second fiber optic cable bundle and bonding material for securing said second fiber optic cable bundle within said internal bore,
   said second ferrule, second fiber optic cable bundle, and bonding material being ground and polished substantially optically flat at a terminal end having a cylindrical embossment dimensioned to be received within the coaxially extending portion of said collar member for aligning said first and second fiber optic cable bundles; external threads on the outermost portion of said second ferrule at its terminal end; and
   a connection sleeve having internal threads at one end dimensioned to engage the external threads of said second ferrule and an inwardly diposed flange at its other end dimensioned to bear upon an end of said collar member for drawing said terminal ends together in aligned assembly.

2. A fiber optic cable connector as claimed in claim 1 including an optically transmissive fluid of substantially the same index of refraction as said fiber optic cables and disposed in common optical contact with said terminal ends for completing the optical path therebetween.

3. A fiber optic cable connector as in claim 1 wherein said bonding material comprises an epoxy.

4. A fiber optic cable connector as claimed in claim 1 wherein the internal bores of said first and second ferrules are partially conically tapered for compacting said fiber optic cable bundles received therein.

5. A fiber optic cable connector as claimed in claim 1 wherein said collar member includes slots disposed transversely relative to its internal threads to facilitate threading it to said first ferrule.

* * * * *